(12) United States Patent
Sherlock

(10) Patent No.: US 8,281,176 B2
(45) Date of Patent: Oct. 2, 2012

(54) BUFFER CIRCUIT AND METHOD

(75) Inventor: Derek A. Sherlock, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 602 days.

(21) Appl. No.: 10/377,304

(22) Filed: Feb. 28, 2003

(65) Prior Publication Data

US 2004/0172571 A1 Sep. 2, 2004

(51) Int. Cl.
*G06F 1/12* (2006.01)
*G06F 1/00* (2006.01)
*H03K 19/00* (2006.01)
*H03K 5/01* (2006.01)
*H03K 5/04* (2006.01)
*H03L 7/00* (2006.01)
*H04L 7/00* (2006.01)

(52) U.S. Cl. ........ 713/400; 713/500; 713/600; 326/93; 327/141; 327/166; 327/172; 375/354

(58) Field of Classification Search .................. 713/400, 713/500, 600; 326/93; 327/141, 166, 172; 375/354
See application file for complete search history.

(56) References Cited

U.S. PATENT DOCUMENTS

| | | | | |
|---|---|---|---|---|
| 5,565,803 | A  * | 10/1996 | Fulcomer | 327/99 |
| 6,466,049 | B1 * | 10/2002 | Diba et al. | 326/37 |
| 6,891,403 | B2 * | 5/2005 | Sharma et al. | 327/47 |
| 7,076,677 | B2 * | 7/2006 | Falconer et al. | 713/400 |
| 2004/0124893 | A1 * | 7/2004 | Falconer et al. | 327/141 |

* cited by examiner

*Primary Examiner* — Stefan Stoynov

(57) ABSTRACT

The disclosed embodiments relate to buffer circuits and methods. One embodiment is a buffer circuit that receives a data signal, a first clock signal and a second clock signal, the buffer circuit comprising circuitry to latch the data signal with the first clock signal to produce a first latched signal, circuitry to latch the data signal with the second clock signal to produce a second latched signal, and circuitry that selects the first latched signal or the second latched signal depending on a transition of the data signal in a previous clock cycle.

19 Claims, 4 Drawing Sheets

BUFFER CIRCUIT AND METHOD

BACKGROUND OF THE RELATED ART

Since the introduction of the first personal computer ("PC"), technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands of software applications ranging from games to word processors and from voice recognition to web browsers.

Not surprisingly, the increasing complexity of computers and software applications has presented technologists with some challenging obstacles along the way. One such obstacle is the continual increase in the amount of computing power needed to run increasingly large and complex software applications. Increased computing power is also needed to enable networked computer systems to provide services such as file and printer sharing to larger numbers of users in a cost effective manner.

One way to increase computing power has been to design computer systems that are capable of processing data faster. Computers may use clock signals to synchronize the processing of data. Bits of data in the form of electrical signals that represent "0s" and "1s" (logical lows and highs) may be clocked into integrated circuit devices, which may process the 0s and 1s to do useful work. Data signals may be passed through a data buffer circuit before being latched and stored in a device known as a register, which may also be known as a latch or flip-flop. A clock signal, which may be an electrical signal in the form of a square wave, may be used to latch data bits into the register. Registers are incorporated into an integrated circuit device to receive data bits and hold them for further processing by the internal workings of the integrated circuit device. The registers may be designed to receive a new data bit with each rising edge (or falling edge) of the clock signal. A rising edge of the clock occurs when the clock signal transitions from a relatively low level to a relatively high level. A falling clock edge occurs when the clock signal transitions from a relatively high level to a relatively low level.

If the speed of the clock is increased, data is processed at a faster rate, with a corresponding increase in computing power. For example, if data bits are being clocked into data buffers for further processing on each rising edge of a system clock, twice as much data may be clocked into the registers if the clock rate is doubled. A potential problem may arise, however, because, as clock speed increases, there is less time during each clock cycle to perform work.

One problem faced by designers of input buffer circuits as clock speeds increase is insufficient data setup time. Setup time refers to the length of time that a data signal should be stable to guarantee that it will be clocked into an input register by the relevant edge of a clock signal. Setup time is potentially a problem because electrical data signals transition rapidly and may take time to settle after a transition (for example a transition from a logical "0" to a logical "1" and vice versa). As clock speeds get faster, the time in which data signals have to stabilize or settle gets shorter. If a data signal is not stable when the relevant clock edge latches the signal into a register, the signal may be incorrectly interpreted. For example, a logical "0" may be mistakenly latched into the register as a logical "1" or vice versa. If data is incorrectly latched into a register, the performance of the computer system is degraded.

Another factor that may affect the clocking of data into a register is the synchronization of the clock signal across multiple data inputs. In many integrated circuit devices, multiple data bits may be clocked in parallel into their respective registers by a single clock signal. Many factors may introduce small variations into the synchronization of the clock signal with respect to when each of the multiple data bits is latched into its register. One factor may be a difference in length that the clock signal has to travel to actuate the registers of different data inputs. Another factor may be that the registers that receive the data have differing voltages at which they are actuated by the clock signal. These differences may result from variations in integrated circuit processing or temperature, among others. A system that may reduce the effects of these variations may be desirable.

SUMMARY

The disclosed embodiments relate to buffer circuits and methods. One embodiment is a buffer circuit that receives a data signal, a first clock signal and a second clock signal, the buffer circuit comprising circuitry to latch the data signal with the first clock signal to produce a first latched signal, circuitry to latch the data signal with the second clock signal to produce a second latched signal, and circuitry that selects the first latched signal or the second latched signal depending on a transition of the data signal in a previous clock cycle.

Another embodiment is a computer system having at least one integrated circuit that includes a buffer circuit. The buffer circuit receives a data signal, a first clock signal and a second clock signal. The buffer circuit comprises circuitry to latch the data signal with the first clock signal to produce a first latched signal, circuitry to latch the data signal with the second clock signal to produce a second latched signal, and circuitry that selects the first latched signal or the second latched signal depending on a transition of the data signal in a previous clock cycle.

Yet another embodiment is a method of operating a buffer circuit that receives a data signal, a first clock signal and a second clock signal. The method comprises receiving a data signal, storing a first latched data signal using a first clock signal, storing a second latched data signal using a second clock signal, selecting the first latched signal or the second latched signal depending on a transition of the data signal in a previous clock cycle.

BRIEF DESCRIPTION OF THE DRAWINGS

Advantages of the invention may become apparent upon reading the following detailed description and upon reference to the drawings in which.

DETAILED DESCRIPTION

Figure 1:
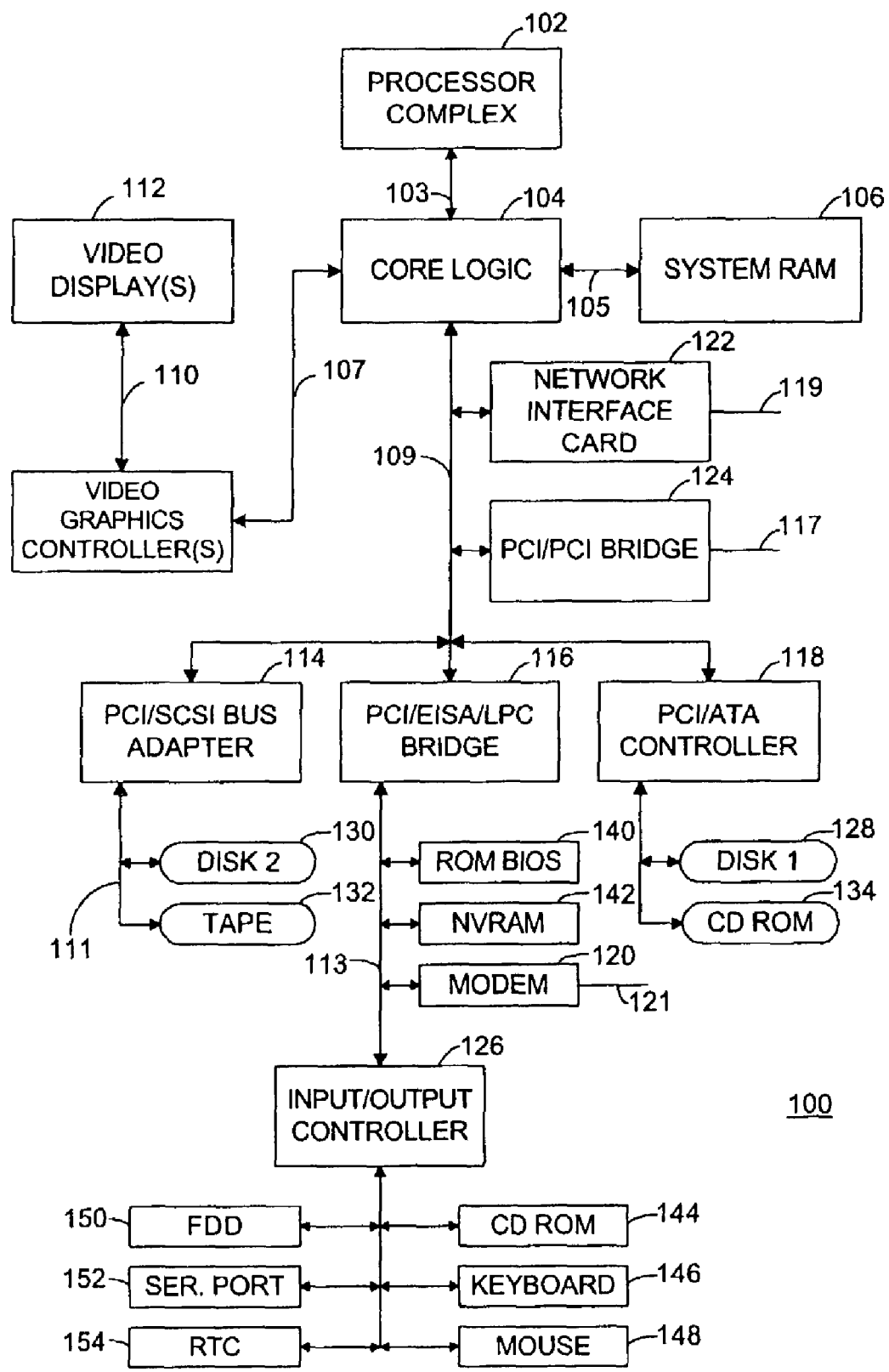
FIG. 1 is a block diagram illustrating a computer system in which embodiments of the present invention may be employed.

FIG. 1 is a block diagram illustrating a computer system in which embodiments of the present invention may be employed. A computer system is generally indicated by the numeral 100 and may comprise a processor complex 102 (which may include a plurality of central processing units ("CPUs")). The computer system 100 may also include core logic 104 (or north bridge), system random access memory ("RAM") 106, a video graphics controller(s) 110, a video display(s) 112, a PCI/SCSI bus adapter 114, a PCI/EISA/ISA bridge 116, and a PCI/ATA controller 118. Single or multi-level cache memory (not illustrated) may also be included in the computer system 100 according to the current art of microprocessor computer systems. Integrated circuit components that make up the processor complex 102, the core logic 104, the RAM 106, for example, may include a plurality of data buffers and registers that are adapted to receive data via a clock or strobe signal.

The processor complex 102 may be connected to the core logic 104 through a host bus 103. The system RAM 106 is connected to the core logic 104 through a memory bus 105. The video graphics controller(s) 110 is connected to the core logic 104 through an AGP bus 107 (or other bus for transporting video data). The PCI/SCSI bus adapter 114, PCI/EISA/LPC bridge 116, and PCI/ATA controller 118 is connected to the core logic 104 through a primary PCI bus 109. Those of ordinary skill in the art will appreciate that a PCI-X bus or Infiniband bus is substituted for the primary PCI bus 109.

Also connected to the PCI bus 109 may be a network interface card ("NIC") 122 and a PCI/PCI bridge 124. Some of the PCI devices such as the NIC 122 and PCI/PCI bridge 124 may plug into PCI connectors on the computer system 100 motherboard (not illustrated). The PCI/PCI bridge 124 may provide an additional PCI bus 117.

Hard disk 130 and tape drive 132 may be connected to the PCI/SCSI bus adapter 114 through a SCSI bus 111. The NIC 122 may be connected to a local area network 119. The PCI/EISA/LPC bridge 116 may connect over an EISA or LPC bus 113 to a non-volatile random access memory (NVRAM) 142, modem 120, and input-output controller 126. The NVRAM 142 may store the system BIOS and/or other programming and may include flash memory. Additionally, the NVRAM may be contained in a programmable logic array ("PAL") or any other type of programmable non-volatile storage. The modem 120 may connect to a telephone line 121. The input-output controller 126 may interface with a keyboard 146, CD-ROM drive 144, mouse 148, floppy disk drive ("FDD") 150, serial/parallel ports 152, and/or a real time clock ("RTC") 154.

Many of the devices shown in FIG. 1 may be implemented as integrated circuit devices that employ buffer circuits according to embodiments of the present invention. The operation of buffer circuits is explained with reference to FIG. 2.

Figure 2:
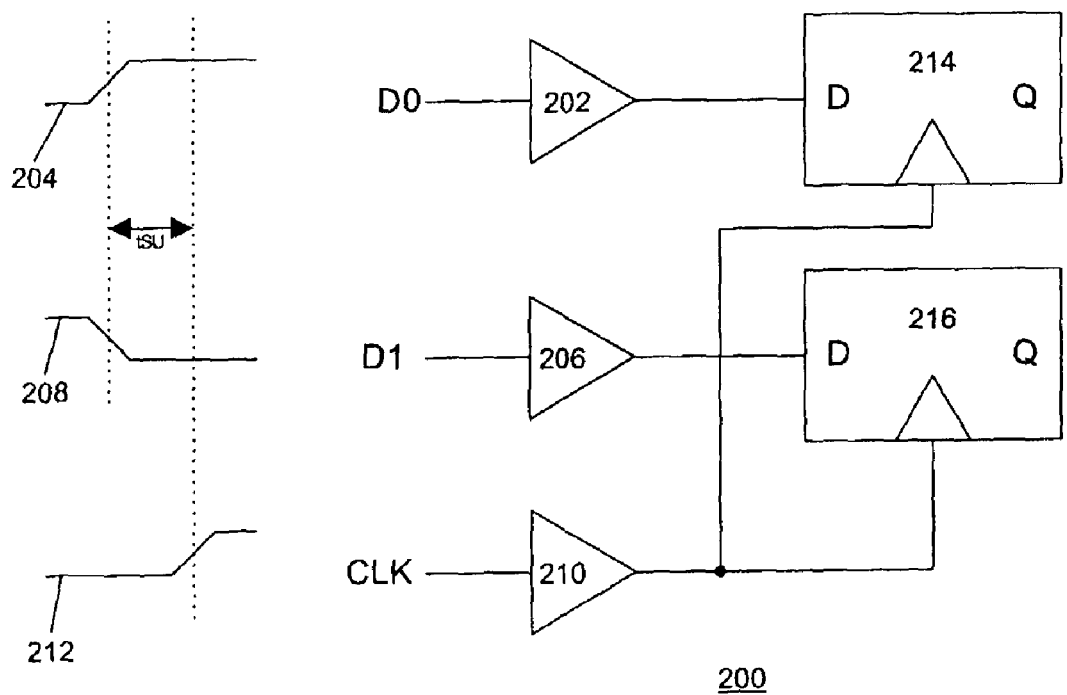
FIG. 2 is a block diagram of an embodiment of a single-ended input buffer circuit in which the embodiments of the present invention may be employed.

FIG. 2 is a block diagram of an embodiment of a single-ended input buffer circuit in which embodiments of the present invention may be employed. The buffer circuit is generally identified by the reference numeral 200. Single ended data signaling is typically used to minimize the number of wires and pins required for data transfer, with a concomitant reduction in the associated design cost.

The buffer circuit 200 comprises a single-ended data buffer 202, which is adapted to receive a data signal $D_0$, and a single-ended data buffer 206, which is adapted to receive a data signal $D_1$. The data signal $D_0$ that may be delivered to the input buffer 202 is illustrated as a waveform 204, which is shown as transitioning from a logical low level to a logical high level. The data signal $D_1$ that may be delivered to the input buffer 206 is illustrated as a waveform 208, which is shown as transitioning from a logical high level to a logical low level. To correctly operate, the data buffers 202, 206 utilize data signals 204, 208 which are stable for a setup time, shown as tSU, prior to being latched. The imposition of the setup time tSU helps to ensure that the data presented to the data buffers 202, 206 is correctly received.

A single-ended clock buffer 210 is adapted to receive a clock signal 212, which may be a square wave. The clock buffer 210 is adapted to deliver the clock signal 212 to a register 214 and a register 216. Transparent latches may be used instead of the registers 214, 216 depending on design considerations. The buffer circuit 200 may employ single-pumped, rising-clock-edge triggered signaling, double-pumped clock signaling designs, or any other appropriate clocking technology.

For illustrative purposes, the clock signal 212 is used to clock data into the registers 214 and 216 on a rising edge, as illustrated by the clock signal 212. The rising edge of the clock signal 212 is synchronized to occur after the end of the setup time tSU. This synchronization may help to ensure the valid data is clocked into the registers 214 and 216. Data that is presented to the D input of the registers 214, 216 may be latched on the rising edge of the clock signal 212 and delivered to the Q output of the registers 214, 216 where it is retrieved for further processing by the internal workings of an integrated circuit device.

The data buffers 202, 206 may have a threshold voltage, which is the voltage level at which the buffer recognizes the transition from a logical low to a logical high and vice versa. Variation in the threshold voltage may negatively impact setup time for the data signals 204, 208. For example, if an input buffer has a higher-than-nominal threshold voltage, the buffer may tend to recognize a rising edge later (with respect to a buffer with a nominal threshold voltage). Similarly, the input buffer with the higher-than-nominal threshold voltage may also tend to recognize falling edges earlier as compared to an input buffer with a lower than nominal threshold voltage. Such variations in threshold voltages may open up timing ambiguity if a buffer recognizes such transitions in the data, and thus reduce setup timing margin. If the buffer has a single-ended clock buffer, the problem may be compounded by similar ambiguity in the timing of the clock or strobe. In such a case, embodiments of the present invention may be employed to advantage.

Figure 3:
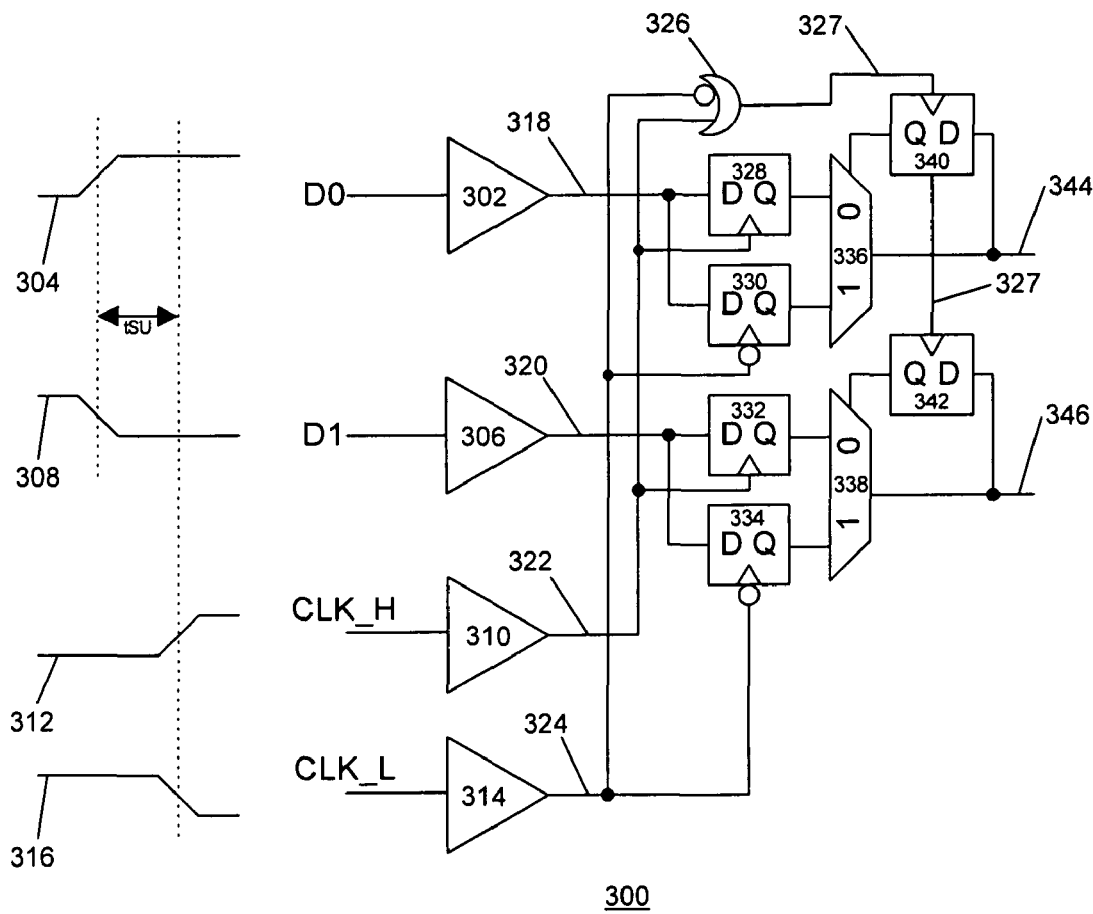
FIG. 3 is a block diagram of an input buffer circuit according to embodiments of the present invention.

FIG. 3 is a block diagram of an input buffer circuit according to embodiments of the present invention. The buffer circuit, which is generally identified by the reference numeral 300, provides relatively improved clock timing. The buffer circuit 300 comprises a single-ended data buffer 302, which is adapted to receive a data signal $D_0$, and a single-ended data buffer 306, which is adapted to receive a data signal $D_1$. The data signal $D_0$ delivered to the input buffer 302 is illustrated as a waveform 304, which is shown as transitioning from a logical low level to a logical high level. The data signal $D_1$ to the input buffer 306 is illustrated as a waveform 308, which is shown as transitioning from a logical high level to a logical low level. To operate correctly, the data buffers 302, 306 employ data signals 304, 308 which are stable for a setup time, shown as tSU, prior to being latched. The imposition of the setup time tSU helps to ensure that the data presented to the data buffers 302, 306 is correctly received.

The input buffer 302 delivers the data signal $D_0$ as an input to a pair of registers 328 and 330 via a signal path 318. The input buffer 306 delivers the data signal $D_1$ as an input to a pair of registers 332 and 334 via a signal path 320. As set forth below, the buffer circuit 300 is designed to select the output of the register pair for each data signal that will provide the most synchronized timing. In other words, the buffer circuit 300 selects the output of the registers 328 or 330 for further processing depending on which of the registers 328 or 330 will provide the best timing for the data signal $D_0$. The data value stored by the register 328 may be referred to as a first latched signal and the data value stored by the register 330 may be referred to as a second latched signal. Similarly, the buffer circuit 300 selects the output of the registers 332 or 334 for further processing depending on which of the registers 332 or 334 will provide the best timing for the data signal $D_1$. The data value stored by the register 332 may be referred to as a first latched signal and the data value stored by the register 334 may be referred to as a second latched signal.

In the embodiment of FIG. 3, a single-ended clock buffer 310 is adapted to receive a clock high (CLK_H) signal 312, which may be a square wave. For illustrative purposes, the clock high signal 312 is shown as transitioning from a low state to a high state. The clock buffer 310 may be adapted to deliver the clock high signal 312 to the register 328 and the register 332 via a signal path 322. Transparent latches may be used instead of the registers 328, 332 depending on design considerations. The buffer circuit 300 may employ single-pumped, rising-clock-edge triggered signaling, double-pumped clock signaling designs, or any other appropriate clocking technology.

A single-ended clock buffer 314 is adapted to receive a clock low (CLK_L) signal 316, which may be a square wave. For illustrative purposes, the clock low signal 316 is shown as transitioning from a high state to a low state. The clock buffer 314 is adapted to deliver the clock low signal 316 to the register 330 and the register 334 via a signal path 324. As illustrated in FIG. 3, the output of the clock buffer 314 is negated prior to being delivered as the clock signal to the registers 330, 334. Transparent latches may be used instead of the registers 330, 334 depending on design considerations.

The output of the clock buffers 310, 314 is delivered as inputs to a logic component 326, which may be an OR gate. The clock low signal is negated before being delivered as the input to the logic component 326. The output of the logic component 326 is used as a clock signal for a register 340 and a register 342 via a signal path 327. The data input to the register 340 is provided as the output of a multiplexor 336, and the data outputs of the registers 328, 330 are provided as inputs to the multiplexor 336. The output of the register 340 is used to select which of the inputs of the multiplexor 336 is delivered as the input of the register 340 and also provided as the data to the internal workings of an integrated circuit component via a data path 344. The output of the register 342 is used to select which of the inputs of the multiplexor 338 is delivered as the input of the register 342 and also provided as the data to the internal workings of an integrated circuit component via a data path 346.

The buffer circuit 300 exploits the fact that multiple receiving buffers implemented on the same IC wafer tend to have well-matched voltage activation thresholds. This may be true because buffers on the same integrated circuit device may share a common process, voltage, and temperature characteristics.

In a system that employs single-ended clocking and enforces a setup time prior to an active edge transition of the clock or strobe, there may be two different scenarios. Either (1) the data transition and clock/strobe transition are both in the same direction (i.e. both rising or both falling), or (2) the data transition and clock/strobe transition are in opposite directions (i.e. one transition is rising and the other transition is falling). In case 1, uncertainty in the voltage thresholds of the data buffers tends to cancel each other out. For example, if the threshold voltage levels are lower than nominal and both signals are rising, then both the clock/strobe and data may tend to be recognized early, but their relative timing is not altered.

The "canceling out" effect described with respect to case 1 may be effective if the edge rates of the data signals and clock/strobe signals are well matched to each other. Thus, the buffer circuit 300 may be well suited for use in connection with data busses on which the device sourcing the data also sources the clock or strobe. Performance may also be improved in cases in which the data signaling circuitry and clock circuitry has similar pad designs, topology, termination schemes, and board routing constraints.

In case 2, uncertainty in the voltage thresholds of the data buffers tends to cause one signal transition to be recognized relatively early with respect to the other transition. For example, if the voltage threshold levels are lower than nominal with the data transition falling and the clock/strobe transition is rising, the data transition may be recognized late, while the clock/strobe transition may be recognized relatively early. This combination may reduce the amount of setup time at the input to an input buffer, potentially causing a timing violation and/or data corruption.

The buffer circuit may reduce or eliminate the timing error that results from case 2 by helping to ensure that, if a given data bit transitions during any particular clock cycle, the data buffer that subsequently samples that data bit is clocked from a single-ended clock/strobe signal that is switching in the same direction as the transition in the data bit. In cases where a data bit does not transition in a given clock cycle, the polarity of the clock/strobe signal that samples it is immaterial.

In the buffer circuit 300, the data signals $D_0$ (304) and $D_1$ (308) may be received, respectively, by the input buffers 302 and 308. The data signals are then each clocked into two different registers, one of which is controlled by the clock high signal 312 and the other of which is controlled by the clock low signal 316. As shown in FIG. 3, the data signal $D_0$ (304) is clocked into the register 328 by the clock high signal 312 via the signal path 322. The data signal $D_0$ (304) is also clocked into the register 330 by the clock low signal 316 via the signal path 324. Similarly, the data signal $D_1$ (308) is clocked into the register 332 by the clock high signal 312 via the signal path 322. The data signal $D_1$ (308) is also clocked into the register 334 by the clock low signal 316 via the signal path 324. Thus, each of the data signals $D_0$ and $D_1$ is clocked into a first register by a rising edge clock transition (clock high signal 312) and into a second register by a falling edge clock transition (clock low signal 316).

If the logical value of a data signal (e.g. the data signals $D_0$ or $D_1$) does not transition between two successive active clock edges (i.e., the value of the data signal stays at the same logical level for two clock active edge transitions instead of either transitioning from a logical low to a logical high or vice versa), then it may be immaterial for timing purposes whether the data is sampled by the clock signal with a falling edge transition (clock low signal 316) or a rising edge transition (clock high signal 312). This is true because the data signal being sampled has virtually an entire clock cycle of setup time since it does not transition in the interim. In such a case, the setup time tSU is easily met.

If the logical value of one of the data signals does transition (e.g. from a logical low to a logical high or vice versa) in a given clock cycle, the data may be sampled by two registers close to simultaneously. One register may sample the data based on the rising clock high signal 312, and the other register may sample the data based on the falling clock low signal 316. Whichever of the clock signals switches the same direction as the data (i.e. high to low or low-to-high) is deemed to be more reliable. The data sampled by the other clock signal may be untrustworthy and possibly metastable. The buffer circuit 300 helps to ensure that the data sample that is actually sampled by the associated integrated circuit is the data that is sampled by the clock signal that transitions in the same direction as the data in cases where the data has transitioned since the previous active clock edge.

The multiplexor 336 receives both data samples of the data signal $D_0$ 304 via the registers 328 and 330. The register 328 delivers the sample that is obtained on the rising edge of the clock high signal 312 and the register 330 delivers the sample that is obtained on the falling edge of the clock low signal 316. Similarly, the multiplexor 338 receives both data samples of the data signal $D_1$ 308 via the registers 332 and 334. The register 332 delivers the sample that is obtained on the rising edge of the clock high signal 312 and the register 334 delivers the sample that is obtained on the falling edge of the clock low signal 316.

The register 340 controls which data sample is selected from the multiplexor 336 and the register 342 controls which data sample is selected from the multiplexor 338. The buffer circuit 300 is designed in such a way that the registers 340 and 342 select the multiplexor input that corresponds to the data that is sampled by the clock signal that transitions in the same direction as the corresponding data signal. To accomplish this, the register 340 and the register 342 store the data from the corresponding clock cycle for comparison. Specifically, the register 340 stores the data symbol or value that the data signal $D_0$ represented at the previous active clock transition and the register 342 stores the data symbol or value that the data signal $D_1$ represented at the previous active clock transition. Moreover, the registers 340 and 342 comprise circuitry that stores a value corresponding to the respective data signals in a previous clock cycle. Those stored values are then used to select between the first latched signal and the second latched signal for each data input.

The Q output of the register 340, which may correspond to the data symbol or value from the previous active clock transition, selects the input of the multiplexor 336 that corresponds to the data sample clocked by the rising clock edge of the clock high signal 312 if the data symbol or value of the data signal Do 304 transitioned from a logical low level to a logical high level. The Q output of the register 340 selects the input of the multiplexor 336 that corresponds to the data sample clocked by the falling clock edge of the clock low signal 316 if the data symbol or value of the data signal $D_0$ 304 transitioned from a logical high level to a logical low level. If the data symbol or value of the data signal $D_0$ 304 does not transition between active clock edges, the multiplexor output selected by the register 340 is irrelevant for timing purposes. The output of the multiplexor 336 may be delivered to the internal workings of an integrated circuit device for further processing via a signal path 344.

The Q output of the register 342, which may correspond to the data symbol or value from the previous active clock transition, selects the input of the multiplexor 338 that corresponds to the data sample clocked by the rising clock edge of the clock high signal 312 if the data symbol or value of the data signal $D_1$ 308 transitioned from a logical low level to a logical high level. The output of the register 342 selects the input of the multiplexor 338 that corresponds to the data sample clocked by the falling clock edge of the clock low signal 316 if the data symbol or value of the data signal $D_1$ 308 transitioned from a logical high level to a logical low level. If the data symbol or value of the data signal $D_1$ 308 does not transition between active clock edges, the multiplexor output selected by the register 342 is irrelevant for timing purposes. The output of the multiplexor 338 may be delivered to the internal workings of an integrated circuit device for further processing via a signal path 346.

The logic component 326 may help to ensure correct operation of the buffer circuit 300. A possible design consideration is meeting a hold time at the input of the register 340 and the register 342. Skew between the rising clock high signal 312 and the falling clock low signal 316 could potentially cause hold time violations at the input of the register 340 or the register 342, if those registers were clocked by the clock high signal 312 or the clock low signal 316. The logic component 326, which receives both the clock high signal 312 and the negation of the clock low signal 316, helps to ensure that the registers 340 and 342 recognize only the earlier of the two clock signals.

Ideally, the drivers and terminators driving a bus are symmetrical, with rising and falling edges having the same clock-to-output delay and slew rate. In practice there are several factors that may tend to make rising and falling edges have unequal timings and edge rates. Some of those factors may include:

1. Difficulty sizing positive field effect transistors ("PFETs") and negative field effect transistors ("NFETs")for identical drive characteristics.
2. Asymmetries in termination (e.g., in busses requiring pull-ups).
3. Asymmetries in ground/power pin counts in driving chip.
4. Asymmetrical ground bounce because more lines switch one way than the other in any given clock cycle.

Each of these factors may tend to give rising and falling edges unequal delays and edge rates. Each of these factors may also tend to effect multiple simultaneously same-direction switching signals identically. By sampling rising data lines with rising clock/strobes, and falling data lines with falling clock/strobes, the buffer circuit 300 may also reduce the setup time margin degradation associated with each of these effects.

Figure 4:
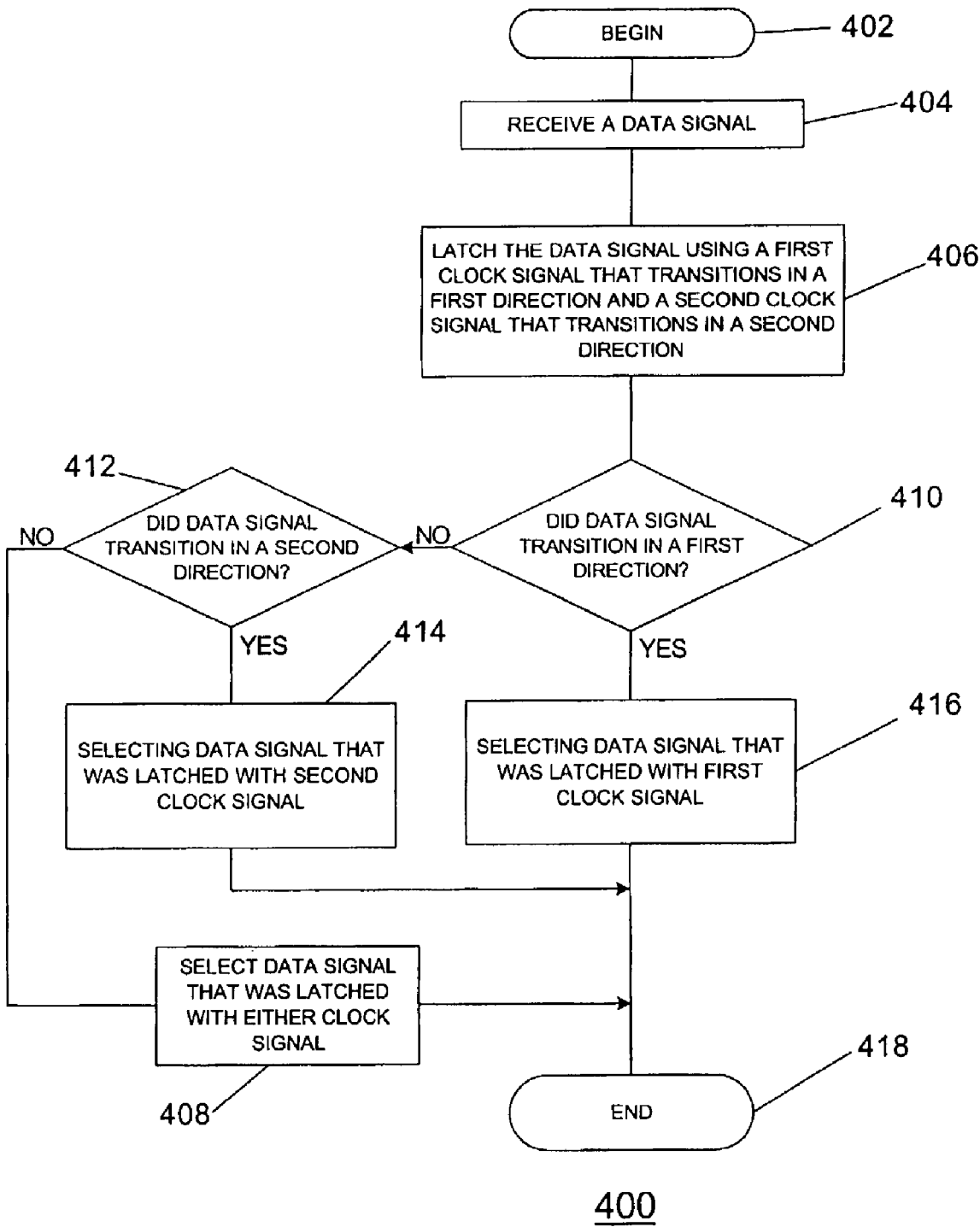
FIG. 4 is a process flow diagram according to embodiments of the present invention.

FIG. 4 is a process flow diagram according to embodiments of the present techniques. The process is generally referred to by the reference numeral 400. At block 402, the process begins. At block 404, a data signal is received by an input buffer circuit such as the buffer circuit 300 (FIG. 3).

The data signal is clocked by two separate clock signals as set forth at block 406. The first and second clock signals may transition in opposite directions, as do the clock high signal 312 and the clock low signal 316 (FIG. 3). If the data signal transitioned in the same direction as the first clock signal (block 410), then the data is latched by the first clock signal, as shown at block 416. If the data signal transitioned in the same direction as the second clock signal (block 412), then the data is latched by the second clock signal, as shown at block 414. If the data signal does not transition (i.e. the data remains at the same value for successive clock cycles), the data signal may be latched by either the first or second clock signal without significantly impacting timing synchronization (block 408). At block 418, the process ends.

What is claimed is:

1. A buffer circuit that receives a data signal, a first clock signal and a second clock signal, the buffer circuit comprising:
    circuitry to latch the data signal with the first clock signal to produce a first latched signal;
    circuitry to latch the data signal with the second clock signal to produce a second latched signal; and circuitry to select the first latched signal or the second latched signal depending solely on a value of the data signal in a previous clock cycle.

2. The buffer circuit set forth in claim 1 wherein the circuitry to select the first latched signal or the second latched signal selects (i) the first latched signal if the previous value of the data signal is a logical low level (ii) the second latched signal if the previous value of the data signal is a logical high level.

3. The buffer circuit set forth in claim 1, comprising circuitry that stores the value of the data signal in the previous clock cycle and use the value to select between the first latched signal and the second latched signal.

4. The buffer circuit set forth in claim 1, wherein the circuitry to select comprises circuitry to latch the value of the data signal in the previous clock cycle using either the first clock signal or the second clock signal depending on whether the first clock signal or the second clock signal is earlier.

5. The buffer circuit set forth in claim 1, wherein the first latched signal and the second latched signal are delivered as inputs to a multiplexor.

6. The buffer circuit set forth in claim 1, wherein either the first latched signal or the second latched signal is selected as an output of a multiplexor based solely on the value of the data signal during the previous clock cycle.

7. The buffer circuit set forth in claim 1, wherein a register is used to store the value of the data signal during the previous clock cycle.

8. The buffer circuit set forth in claim 1, comprising at least one single-ended data buffer.

9. A buffer circuit to receive a data signal, a first clock signal and a second clock signal, the buffer circuit comprising:
   means for latching the data signal with the first clock signal to produce a first latched signal;
   means for latching the data signal with the second clock signal to produce a second latched signal; and
   means for selecting the first latched signal or the second latched signal depending solely on a value of the data signal in a previous clock cycle.

10. The buffer circuit set forth in claim 9, comprising:
    means for selecting the first latched signal if the previous value of the data signal is a logical low level; and
    means for selecting the second latched signal if the previous value of the data signal is a logical high level.

11. The buffer circuit set forth in claim 9, comprising means for storing the value of the data signal in the previous clock cycle and using the value to select between the first latched signal and the second latched signal.

12. The buffer circuit set forth in claim 9, comprising means for latching the value of the data signal in the previous clock cycle using either the first clock signal or the second clock signal depending on whether the first clock signal or the second clock signal is earlier.

13. A computer system having at least one integrated circuit component that comprises a buffer circuit, the buffer circuit operable to receive a data signal, a first clock signal and a second clock signal, the buffer circuit comprising:
    circuitry to latch the data signal with the first clock signal to produce a first latched signal;
    circuitry to latch the data signal with the second clock signal to produce a second latched signal; and
    circuitry to select the first latched signal or the second latched signal depending solely on a value of the data signal in a previous clock cycle.

14. The computer system set forth in claim 13, wherein the circuitry to select the first latched signal or the second latched signal selects (i) the first latched signal if the previous value of the data signal is a logical low level and (ii) the second latched signal if the previous value of the data signal is a logical high level.

15. The computer system set forth in claim 13, wherein the buffer circuit comprises circuitry to store the value of the data signal in the previous clock cycle and use the value to select between the first latched signal and the second latched signal.

16. The computer system set forth in claim 15, wherein the circuitry to store the value comprises circuitry that latches the value of the data signal in the previous clock cycle using either the first clock signal or the second clock signal depending on whether the first clock signal or the second clock signal is earlier.

17. A method of operating a buffer circuit to receive a data signal, a first clock signal and a second clock signal, the method comprising:
    storing a previous value of the data signal in a previous clock cycle;
    receiving a current value of the data signal;
    storing a first latched data signal using the first clock signal that transitions from high to low;
    storing a second latched data signal using the second clock signal that transitions from low to high;
    latching the data signal with the first clock signal if the previous value of the data signal is a logical high value;
    latching the data signal with the second clock signal if the previous value of the data signal is a logical low value; and
    latching the previous value of the data signal in the previous clock cycle using either the first clock signal or the second clock signal depending on whether the first clock signal or the second clock signal is earlier.

18. The method set forth in claim 17 comprising delivering the first latched signal and the second latched signal as inputs to a multiplexor.

19. The method set forth in claim 18 comprising:
    selecting either the first latched signal or the second latched signal as an output of the multiplexor.

* * * * *

UNITED STATES PATENT AND TRADEMARK OFFICE
CERTIFICATE OF CORRECTION

| | |
|---|---|
| PATENT NO. | : 8,281,176 B2 |
| APPLICATION NO. | : 10/377304 |
| DATED | : October 2, 2012 |
| INVENTOR(S) | : Derek A. Sherlock |

It is certified that error appears in the above-identified patent and that said Letters Patent is hereby corrected as shown below:

In column 9, line 21, in Claim 5, delete "multiplexor." and insert -- multiplexer. --, therefor.

In column 9, line 24, in Claim 6, delete "multiplexor" and insert -- multiplexer --, therefor.

In column 10, line 49, in Claim 18, delete "multiplexor." and insert -- multiplexer. --, therefor.

In column 10, line 52, in Claim 19, delete "multiplexor." and insert -- multiplexer. --, therefor.

Signed and Sealed this
Nineteenth Day of March, 2013

Teresa Stanek Rea
*Acting Director of the United States Patent and Trademark Office*